(12) United States Patent
Yamashiro et al.

(10) Patent No.: US 12,030,808 B2
(45) Date of Patent: Jul. 9, 2024

(54) METHOD FOR MANUFACTURING AN OPTICAL FIBER

(71) Applicant: Fujikura Ltd., Tokyo (JP)

(72) Inventors: Kenji Yamashiro, Suzuka (JP); Miryo Kashiwazaki, Suzuka (JP)

(73) Assignee: Fujikura Ltd., Tokyo (JP)

(*) Notice: Subject to any disclaimer, the term of this patent is extended or adjusted under 35 U.S.C. 154(b) by 614 days.

(21) Appl. No.: 17/159,670

(22) Filed: Jan. 27, 2021

(65) Prior Publication Data

US 2021/0230058 A1 Jul. 29, 2021

(30) Foreign Application Priority Data

Jan. 29, 2020 (JP) ................................ 2020-012701
Dec. 14, 2020 (JP) ................................ 2020-206611

(51) Int. Cl.
*C03C 25/26* (2018.01)
*C03C 25/106* (2018.01)
*C03C 25/12* (2006.01)
*C03C 25/607* (2018.01)

(52) U.S. Cl.
CPC ............ *C03C 25/12* (2013.01); *C03C 25/106* (2013.01); *C03C 25/26* (2013.01)

(58) Field of Classification Search
CPC ...... B05D 3/002; B05D 3/0466; C03C 25/12; C03C 25/106; C03C 25/26
See application file for complete search history.

(56) References Cited

U.S. PATENT DOCUMENTS

| 5,035,484 | A | * | 7/1991 | Ishiguro | ................. | C03C 25/223 |
| | | | | | | 427/60 |
| 5,377,491 | A | * | 1/1995 | Schulte | ............. | C03B 37/02718 |
| | | | | | | 65/510 |
| 2011/0274404 | A1 | * | 11/2011 | Okada | ..................... | C03C 25/12 |
| | | | | | | 65/432 |
| 2012/0093470 | A1 | * | 4/2012 | Terruzzi | ............... | C09D 175/16 |
| | | | | | | 385/123 |

FOREIGN PATENT DOCUMENTS

| JP | S57-183333 | A | 11/1982 |
| JP | H02-167843 | A | 6/1990 |
| JP | H10-194791 | A | 7/1998 |
| JP | 2000-34137 | A | 2/2000 |
| JP | 2004-26615 | A | 1/2004 |
| JP | 2013018669 | A | 1/2013 |
| WO | 2010-119696 | A1 | 10/2010 |

OTHER PUBLICATIONS

Notice of Reasons for Refusal issued in corresponding Japanese Patent Application No. 2020-206611, dated Jan. 9, 2024.

* cited by examiner

*Primary Examiner* — Robert S Walters, Jr.
*Assistant Examiner* — Kristen A Dagenais
(74) *Attorney, Agent, or Firm* — Osha Bergman Watanabe & Burton LLP

(57) ABSTRACT

A method for manufacturing an optical fiber, the method includes: exposing a bare fiber formed of glass and having a temperature of 500° C. to 1,500° C. to a gas in which a moisture content is controlled to 2 to 20 $g/m^3$; applying an uncured resin to an outer periphery of the bare fiber; and curing the resin to form a coating layer.

8 Claims, 3 Drawing Sheets

METHOD FOR MANUFACTURING AN OPTICAL FIBER

CROSS-REFERENCE TO RELATED APPLICATIONS

This application is based on and claims priority from Japanese Patent Application No. 2020-012701 filed on Jan. 29, 2020, and Japanese Patent Application No. 2020-206611 filed on Dec. 14, 2020, the contents of which are incorporated herein by reference.

BACKGROUND

Technical Field

The present invention relates to a method for manufacturing an optical fiber.

Related Art

In a method for manufacturing an optical fiber disclosed in Japanese Unexamined Patent Application, First Publication 2013-18669, an optical fiber preform is heated to draw a bare fiber, a bare fiber is cooled to a predetermined temperature by a cooling device, and then a gas including a predetermined moisture content (humidity controlled gas) is supplied to a surface of the bare fiber. Japanese Unexamined Patent Application, First Publication 2013-18669 does not disclose a target temperature for cooling by the cooling device. However, in order to apply a resin to an outer periphery of the bare fiber after cooling, the target temperature for cooling is generally set to 100° C. or lower.

As a result of studies of the inventors of the present application, it is found that, in a case where the humidity controlled gas is supplied after cooling the bare fiber, and then the resin is applied, as in the related art, adhesiveness between the resin and the bare fiber might not be sufficient.

SUMMARY

One or more embodiments provide a method for manufacturing an optical fiber capable of increasing adhesiveness between a resin and a bare fiber.

One or more embodiments provide a method for manufacturing an optical fiber. The method includes: exposing a bare fiber having a temperature of 500° C. to 1,500° C. formed of glass to a gas in which a moisture content is controlled to 2 to 20 g/m$^3$; applying an uncured resin to an outer periphery of the bare fiber; and curing the resin to form a coating layer.

According to one or more embodiments, it is possible to provide a method for manufacturing an optical fiber capable of increasing adhesiveness between a resin and a bare fiber.

DETAILED DESCRIPTION

Embodiments of the present invention will be described herein with reference to the drawings. Those skilled in the art will recognize that many alternative embodiments can be accomplished using the teaching of the present invention and that the present invention is not limited to the embodiments illustrated herein for explanatory purposes.

First Embodiment

Hereinafter, a method for manufacturing an optical fiber of the first embodiment will be described with reference to the drawings.

Figure 1:
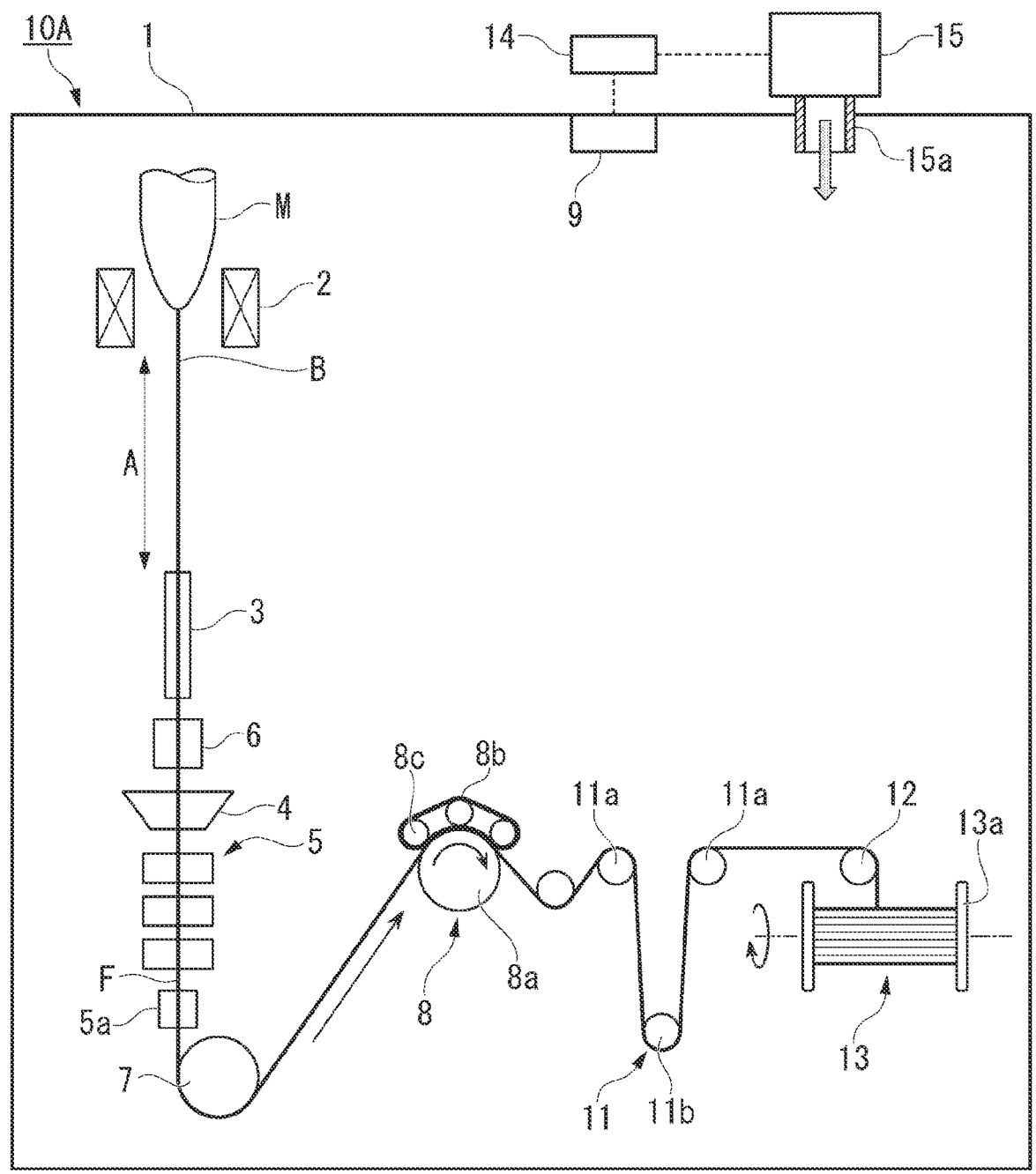
FIG. 1 is a schematic view of a manufacturing apparatus according to a first embodiment.

As shown in FIG. 1, an optical fiber manufacturing apparatus (hereinafter, referred to as a manufacturing apparatus 10A) includes a heating furnace 2, a cooling device 3, a coating unit 4, a curing unit 5, a bare fiber diameter measurement unit 6, a direction changer 7, a take-up unit 8, a dancer unit 11, a final pulley 12, and a winding device 13. In addition, the manufacturing apparatus 10A includes a building 1 housing each of the units 2 to 13, a hygrometer 9, a control unit 14, and a humidity control unit 15.

A bare fiber B is drawn from a preform M by the manufacturing apparatus 10A and a coating layer is provided on an outer periphery of the bare fiber B to manufacture an optical fiber F.

The heating furnace 2 heats and melts the preform M formed of glass. Accordingly, the bare fiber B formed of glass is obtained. The cooling device 3 cools the bare fiber B drawn out from the preform M by blowing a cooling gas onto the bare fiber B. A temperature of the bare fiber B immediately after being drawn out from the heating furnace 2 is, for example, approximately 2,000° C. In a case where the bare fiber B is coated with a resin to be a coating layer at such a high temperature, a coating layer in a desired state cannot be obtained. Therefore, the cooling device 3 cools the bare fiber B to, for example, 100° C. or lower.

As the cooling gas, a gas in which helium and other inert gases (carbon dioxide, nitrogen, or the like) are mixed may be used. In addition, as the cooling gas, helium may be used alone, or a gas other than helium may be used. However, since helium is an inert gas having a high thermal conductivity, it is suitable as a cooling gas. The bare fiber B may be cooled by natural cooling without using the cooling device 3.

The bare fiber diameter measurement unit 6 is disposed on an upstream of the coating unit 4 and measures an outer diameter of the bare fiber B. In addition, the bare fiber diameter measurement unit 6 may be disposed on an upstream of the cooling device 3 or may be disposed on a downstream of the cooling device 3.

The coating unit 4 coats the outer periphery of the bare fiber B with a resin such as a UV curable resin. The curing unit 5 cures the resin coated on the bare fiber B to form a coating layer. In a case where the coating layer is a UV curable resin, an ultraviolet irradiation lamp, a UV-LED, or a combination thereof may be used as the curing unit 5. A coating diameter measurement unit 5a for measuring the outer diameter of the coating layer is provided on a downstream of the curing unit 5.

The direction changer 7 changes a direction of the optical fiber F and introduces the optical fiber F into the take-up unit 8.

The take-up unit 8 is a portion for adjusting a drawing speed when manufacturing the optical fiber F. The take-up unit 8 adjusts the drawing speed based on the outer diameter of the bare fiber B measured by the bare fiber diameter measurement unit 6 so that the outer diameter of the bare fiber B is kept within a predetermined range. The take-up unit 8 of the first embodiment is a so-called take-up capstan, and includes a pinch roller 8a, a belt 8b, and a plurality of driving rollers 8c. The belt 8b is formed in a ring shape, and the plurality of driving rollers 8c are disposed inside the belt 8b. The driving rollers 8c apply a driving force to the belt 8b. A part of the belt 8b is disposed along an outer peripheral surface of the pinch roller 8a.

A propulsive force is applied to the optical fiber F by rotating the belt 8b and the pinch roller 8a in a state where the optical fiber F is sandwiched between the belt 8b and the pinch roller 8a. The drawing speed of the optical fiber F is a speed corresponding to a rotation speed of the belt 8b and the pinch roller 8a. In addition, in a case where the drawing speed can be adjusted, the configuration of the take-up unit 8 may be changed as appropriate.

The dancer unit 11 is positioned between the take-up unit 8 and the final pulley 12. The dancer unit 11 includes two fixed pulleys 11a whose positions are fixed, and a dancer pulley 11b which is positioned between the two fixed pulleys 11a and is displaced with respect to the fixed pulleys 11a. In the dancer unit 11, the optical fiber F is hung on two fixed pulleys 11a and the dancer pulley 1b. In addition, a predetermined tension is applied to the optical fiber F by the dancer pulley 11b. The tension may be due to the empty weight of the dancer pulley 1b, or may be due to a weight or an urging member (spring or the like).

The optical fiber F is introduced to the winding device 13 by the final pulley 12 and wound around a bobbin 13a.

The hygrometer 9 is disposed inside the building 1. The hygrometer 9 measures a humidity inside the building 1 and outputs it to the control unit 14. The hygrometer 9 and the control unit 14 are electrically connected to each other, and the control unit 14 and the humidity control unit 15 are electrically connected to each other.

The control unit 14 controls the humidity control unit 15 based on a measurement result of the humidity in the building 1 obtained by the hygrometer 9. As the control unit 14, a microcontroller, an integrated circuit such as an Integrated Circuit (IC), a Large-scale Integrated Circuit (LSI), or an Application Specific Integrated Circuit (ASIC), a Numerical Control (NC) device, or the like can be used. In a case where the NC device or the like is used as the control unit 14, machine learning may or may not be used.

The humidity control unit 15 supplies a humidity controlled gas, having the humidity controlled based on a command from the control unit 14, from a supply port 15a to the inside of the building 1. The humidity inside the building 1 is controlled by the hygrometer 9, the control unit 14, and the humidity control unit 15 so that the moisture content (the moisture content of gas, which is also defined as volumetric humidity) is 2 to 20 g/m$^3$.

Here, in the first embodiment, a slow cooling section A is provided between the heating furnace 2 and the cooling device 3. In the slow cooling section A, the bare fiber B is slowly cooled by natural cooling. In the first embodiment, the length of the slow cooling section A and the drawing speed of the bare fiber B are determined so that the temperature of the bare fiber B in the slow cooling section A is within a range of 500° C. to 1,500° C. The bare fiber B is exposed to the humidity controlled gas (air in the building 1) having the humidity controlled by the humidity control unit 15 at least in the slow cooling section A. A temperature control unit (electric furnace or the like) for controlling the temperature of the bare fiber B may be disposed in the slow cooling section A.

As described above, in the method for manufacturing the optical fiber of the first embodiment, the bare fiber B having a temperature of 500° C. to 1,500° C. formed of glass is exposed to the gas (the humidity controlled gas) in which the moisture content is controlled to 2 to 20 g/m$^3$, an uncured resin is applied to an outer periphery of the bare fiber B, and the resin is cured to form a coating layer.

A degree of adhesion between the resin (coating layer) and the bare fiber B depends on a strength of the covalent bond between a hydroxyl group on the surface of the bare fiber B and the component included in the resin (for example, silanol included in a silane coupling agent). Here, in a case where the humidity controlled gas having a moisture content of 2 to 20 g/m$^3$ is supplied to the bare fiber B at a high temperature of 500° C. to 1,500° C., the hydroxyl group on the surface of the bare fiber B is sufficiently activated. Then, a resin is applied to the bare fiber B in a state where the hydroxyl group is activated, and the resin is cured to form a coating layer, thereby obtaining an optical fiber F having increased adhesiveness between the resin and the bare fiber B.

In addition, in the first embodiment, the bare fiber B is cooled by the cooling device 3 after the bare fiber B is exposed to the humidity controlled gas in the slow cooling section A. Therefore, it is possible to suppress dew condensation inside the cooling device 3, compared to a case where the humidity controlled gas is directly supplied to the inside of the cooling device 3, for example.

Second Embodiment

Next, a second embodiment will be described, but the basic configuration is the same as that in the first embodiment. Therefore, the same reference numerals are given to the same configurations, a description thereof is omitted, and only different points will be described.

Figure 2:
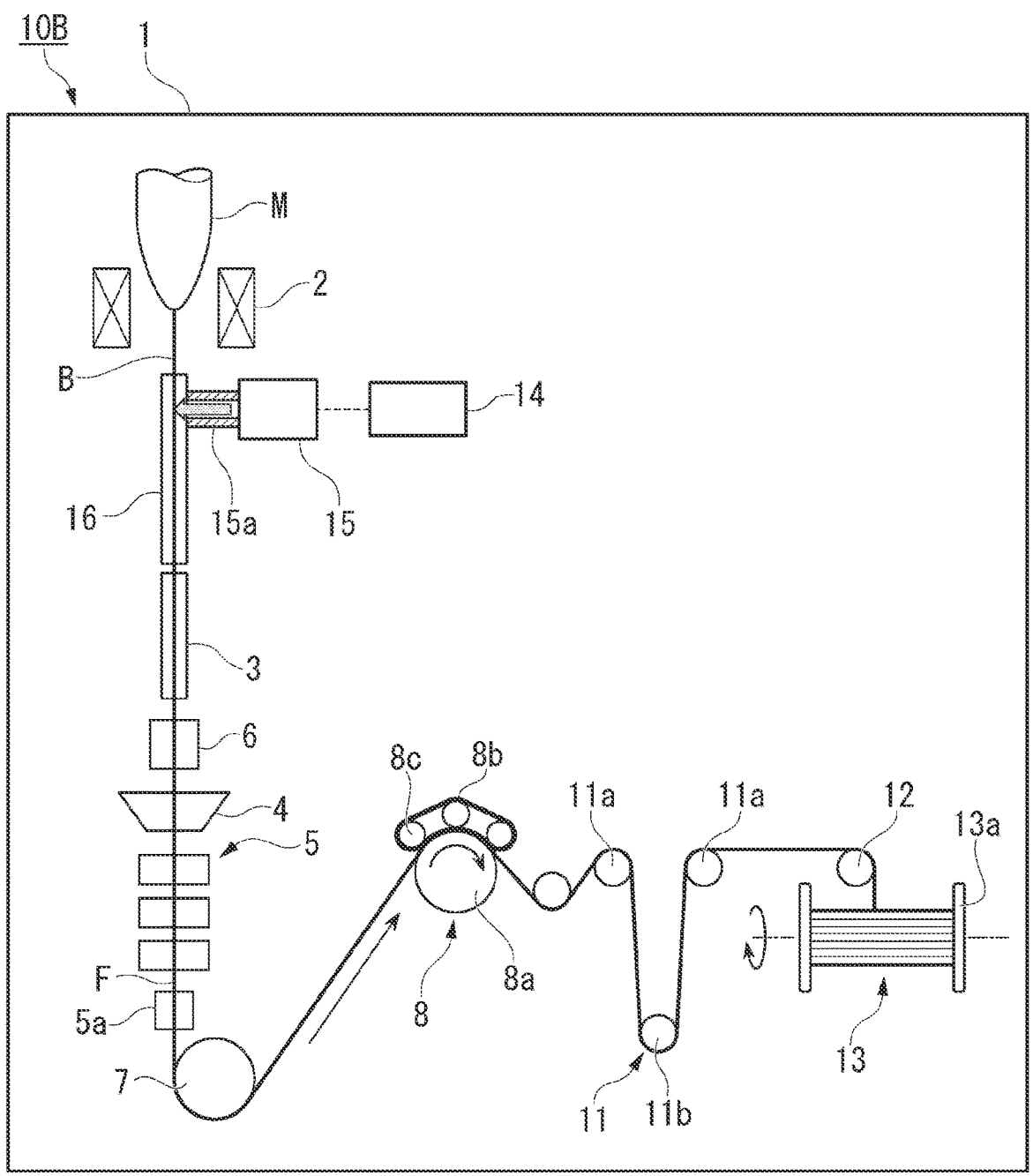
FIG. 2 is a schematic view of a manufacturing apparatus according to a second embodiment.

As shown in FIG. 2, the manufacturing apparatus 10B of the second embodiment includes a humidity control cylinder 16. The humidity control cylinder 16 extends along a path line of the bare fiber B, and the bare fiber B is passed through the inside thereof. The humidity control cylinder 16 is disposed on a downstream of the heating furnace 2 and on an upstream of the cooling device 3. The supply port 15a of the humidity control unit 15 is connected to the humidity control cylinder 16. A control unit 14 is electrically connected to the humidity control unit 15. In addition, a hygrometer (not shown) is provided inside the humidity control cylinder 16, and the hygrometer is electrically connected to the control unit 14.

The control unit 14 of the second embodiment controls the humidity control unit 15 based on the measurement result of the humidity in the humidity control cylinder 16 obtained by the hygrometer. The humidity control unit 15 supplies a humidity controlled gas, having the humidity controlled based on a command from the control unit 14, from a supply port 15a to the inside of the humidity control cylinder 16. The humidity inside the humidity control cylinder 16 is controlled by the hygrometer, the control unit 14, and the humidity control unit 15 so that the moisture content is 2 to 20 g/m$^3$. In the same manner as in the slow cooling section A in the first embodiment, a length of the humidity control cylinder 16 and the drawing speed of the bare fiber B are determined so that a temperature of at least a part of the bare fiber B inside the humidity control cylinder 16 is within a range of 500° C. to 1,500° C.

As described above, also in the method for manufacturing the optical fiber of the second embodiment, the bare fiber B having a temperature of 500° C. to 1,500° C. formed of glass is exposed to the humidity controlled gas in which the moisture content is controlled to 2 to 20 g/m$^3$, an uncured resin is applied to an outer periphery of the bare fiber, and the resin is cured to form a coating layer. Therefore, the same effect as in the first embodiment can be obtained.

In addition, in the second embodiment, the bare fiber B is cooled by the cooling device 3 after the bare fiber B is exposed to the humidity controlled gas in the humidity control cylinder 16. Therefore, it is possible to suppress dew condensation inside the cooling device 3, compared to a case where the humidity controlled gas is directly supplied to the inside of the cooling device 3, for example.

In addition, by using the humidity control cylinder 16, it is possible to more accurately manage the moisture content of the humidity controlled gas that comes into contact with the bare fiber B.

Third Embodiment

Next, a third embodiment will be described, but the basic configuration is the same as that in the first embodiment. Therefore, the same reference numerals are given to the same configurations, a description thereof is omitted, and only different points will be described.

Figure 3:
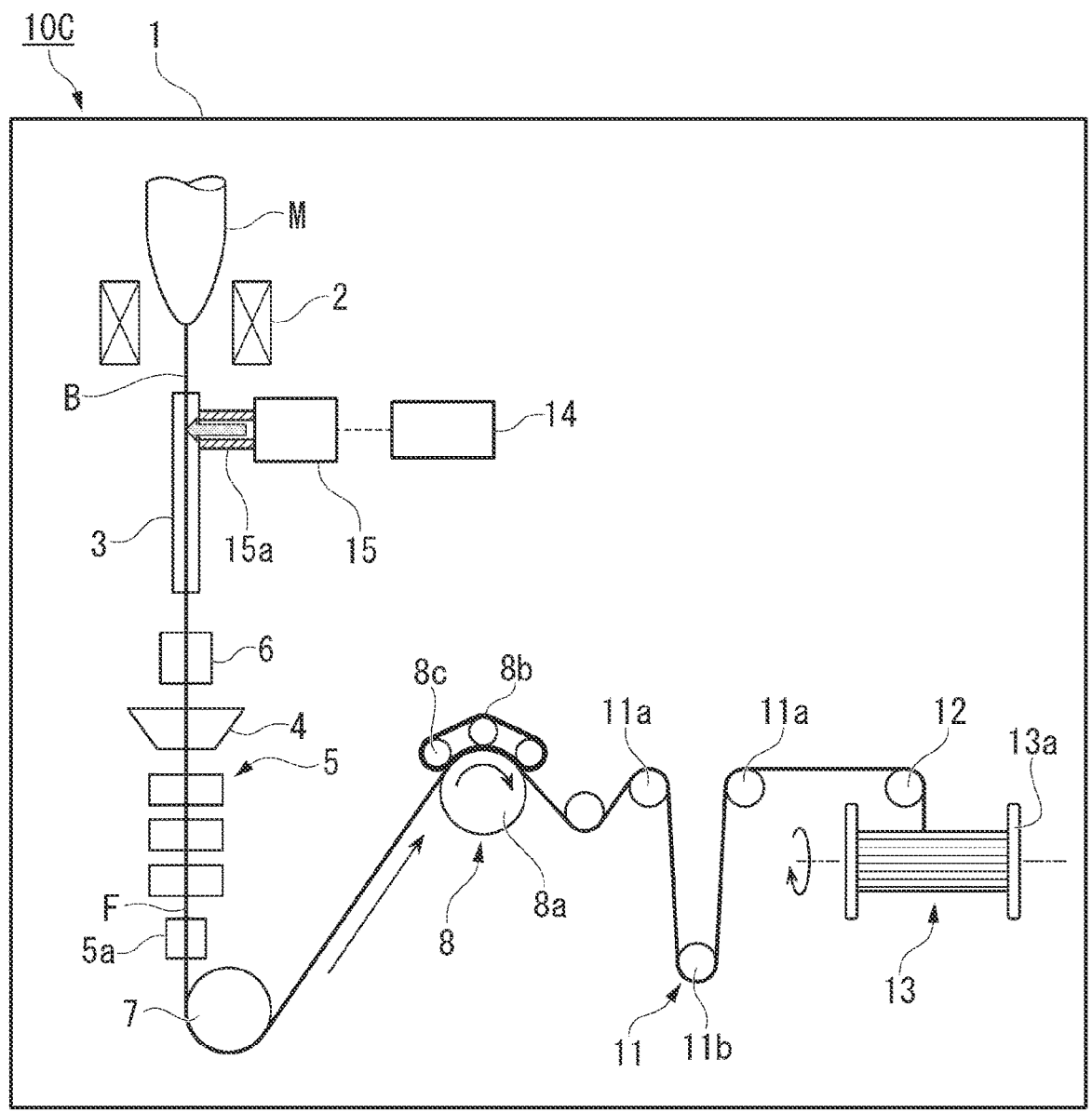
FIG. 3 is a schematic view of a manufacturing apparatus according to a third embodiment.

As shown in FIG. 3, in a manufacturing apparatus 10C of the third embodiment, the supply port 15a of the humidity control unit 15 is connected to the cooling device 3. In addition, the humidity control unit 15 is configured to control a humidity of a cooling gas and supply it to the cooling device 3. That is, the humidity controlled gas in the third embodiment may also be a cooling gas. As described in the first embodiment, helium or the like can be used as the cooling gas. The humidity control unit 15 controls the humidity of the cooling gas such as helium and supplies it to the cooling device 3. In addition, a hygrometer (not shown) is disposed inside the cooling device 3.

The control unit 14 of the third embodiment controls the humidity control unit 15 based on the measurement result of the humidity in the cooling device 3 obtained by the hygrometer. The humidity control unit 15 supplies a humidity controlled gas, having the humidity controlled based on a command from the control unit 14, from a supply port 15a to the inside of the cooling device 3. The humidity inside the cooling device 3 is controlled by the hygrometer, the control unit 14, and the humidity control unit 15 so that the moisture content is 2 to 20 g/m$^3$.

The cooling device 3 cools the bare fiber B to a temperature suitable for coating the bare fiber B with a resin (for example, 100° C. or lower). Meanwhile, the temperature of the bare fiber B entering the cooling device 3 from the heating furnace 2 is approximately 2,000° C. Therefore, the temperature of the bare fiber B is in a range of 500° C. to 1,500° C. in at least a part of the inside of the cooling device 3.

As described above, also in the method for manufacturing the optical fiber of the third embodiment, the bare fiber B at 500° C. to 1,500° C. formed of glass is exposed to the humidity controlled gas in which the moisture content is controlled to 2 to 20 g/m$^3$, an uncured resin is applied to an outer periphery of the bare fiber, and the resin is cured to form a coating layer. Therefore, the same effect as in the first embodiment can be obtained.

In addition, the humidity controlled gas in the third embodiment includes helium, and the bare fiber B is exposed to the humidity controlled gas in the cooling device 3 for cooling the bare fiber B. Therefore, it is possible to reduce the required size of the building 1, compared to a case where the section only for humidity control is provided on the pass line separately from the cooling device 3, for example.

EXAMPLES

Hereinafter, the above embodiments will be described with reference to specific examples. The present invention is not limited to the following examples.

An optical fiber was manufactured by the manufacturing apparatus 10A having the configuration shown in FIG. 1. The time required for the bare fiber B to pass through the slow cooling section A (that is, humidification time T) was changed in a range of 0.05 to 0.4 seconds. In addition, the moisture content W of the humidity controlled gas filled in the building 1 was changed in a range of 2 to 22 g/m$^3$. The temperature of the bare fiber B between the heating furnace 2 and the cooling device 3 was approximately 500° C. to 15,000° C. The results of evaluating the effects of the moisture content W of the humidity controlled gas and the humidification time T on the adhesiveness of the coating layer to the bare fiber under the above conditions will be described with reference to Table 1.

Table 1 shows the results of confirming whether or not the coating layer of the optical fiber manufactured under each condition and wound around the bobbin 13a is properly adhered to the bare fiber. As shown in FIG. 1, after the coating layer is formed, the optical fiber passes through the take-up unit 8 and the dancer unit 11. At that time, in a case where the adhesion of the coating layer to the bare fiber is weak, the coating layer may be peeled off from the bare fiber. In Table 1, "OK" indicates a case where the coating layer is not peeled from the bare fiber, and "NG" indicates a case where the coating layer is peeled from the bare fiber. In a case where the coating layer is peeled off from the bare fiber, this easily causes an increase in light transmission loss, especially in a low temperature environment.

TABLE 1

| Peeling of coating layer | | Moisture content W of humidity controlled gas (g/m$^3$) | | | | | | | |
|---|---|---|---|---|---|---|---|---|---|
| | | 2 | 3 | 4 | 5 | 10 | 15 | 20 | 22 |
| Humidification time T (sec) | 0.05 | OK | OK | OK | OK | OK | OK | OK | NG |
| | 0.1 | OK | OK | OK | OK | OK | OK | NG | NG |
| | 0.2 | OK | OK | OK | OK | OK | OK | NG | NG |
| | 0.3 | OK | OK | OK | OK | OK | OK | NG | NG |
| | 0.4 | OK | OK | OK | OK | NG | NG | NG | NG |

As shown in Table 1, in a case where the moisture content W of the humidity controlled gas was 22 g/m$^3$, although the humidification time T was any of 0.05 to 0.4 seconds, the coating layer was peeled off from the bare fiber (NG). As described above, it was confirmed that, in a case where the humidification was excessive, the adhesiveness between the bare fiber and the coating layer was decreased and the coating layer was peeled off. The mechanism that results in this is not clear, but it can be inferred as follows. As described above, since the hydroxyl group contributes to the covalent bond between the glass (bare fiber) and the resin, in a case where the hydroxyl group is insufficient, the adhesiveness between the resin (coating layer) and the glass is decreased. Meanwhile, the hydroxyl group also has an action of deactivating the silane coupling agent included in the resin. Accordingly, in a case where the humidification is excessive and, as a result, the hydroxyl groups existing on the surface of the bare fiber are also excessive, it is considered that, the silane coupling agent in the resin may be deactivated, before the hydroxyl group contributes to the adhesion reaction between the resin and the glass, and this rather decreases the adhesiveness between the resin and the glass. In addition, it is possible to increase the adhesiveness between the resin and the glass by adding a larger amount of the silane coupling agent to the uncured resin, but in this case, it is disadvantageous from a viewpoint of the material cost of the resin.

Meanwhile, as shown in Table 1, it was confirmed that, in a range of the moisture content W of 2 to 20 $g/m^3$, it is possible to suppress the peeling of the coating layer by setting the humidification time T to an appropriate value. This range of the moisture content is considered as an effective range for ensuring the adhesiveness between the resin and the bare fiber by allowing the hydroxyl groups to be present on the surface of the bare fiber in just proportion.

Based on the above results, it is possible to increase the adhesiveness between the resin and the bare fiber, by employing the manufacturing method including exposing a bare fiber having a temperature of 500° C. to 1,500° C. formed of glass to a humidity controlled gas in which the moisture content W is controlled to 2 to 20 $g/m^3$, applying an uncured resin to an outer periphery of the bare fiber, and curing the resin to form a coating layer.

More specifically, from the results in Table 1, in a case where the moisture content W ($g/m^3$) and the humidification time T (sec) of the humidity controlled gas are within ranges of Expressions (1) and (2), it is possible to suppress the peeling of the coating layer.

$$2 \leq W \leq 5 \text{ and } 0.05 \leq T \leq 0.4 \quad (1)$$

$$10 \leq W \leq 15 \text{ and } 0.05 \leq T \leq 0.3 \quad (2)$$

Meanwhile, after the optical fiber is manufactured, for example, when the optical fibers are fused and connected to each other, the coating layer may be removed to expose the bare fiber. In a case where the coating layer is excessively adhered to the bare fiber, it may be difficult to remove the coating layer which causes decreasing of workability, or the bare fiber may be damaged, when the coating layer is to be removed. Therefore, the results of confirming the ease of removal of the coating layer will be described with reference to Table 2.

As an index to confirm the ease of removal of the coating layer, a pulling force that the glass portion (the bare fiber) is pulled from the coating layer is measured, and the adhesiveness between the bare fiber and the coating layer is evaluated. A measuring method of the pulling force shown in Table 2 will be described below.

A sample for measuring the pulling force is prepared such that an optical fiber manufactured in each condition is cut in a predetermined length, and a notch of the coating layer is formed around the optical fiber in a circumferential direction. One of the end portion of the sample is fixed, and the only coating layer at the other end portion of the sample is pulled at the speed of 3 mm/min. A maximum pulling force is measured until the coating layer is fractured, and the maximum value is recorded as the pulling force (N/mm.)

Values shown in Table 2 are the pulling forces (N/mm) measured as described above. In Table 2, "A", "B", and "C" showing below the value of the pulling force indicate the ease of removal in a case where the coating layer of the optical fiber manufactured under each condition is removed by a hot jacket stripper normally used by construction workers. Specifically, "A" indicates a case where the coating layer is easily removed and a residue of the coating layer does not adhere to the bare fiber. "B" indicates a case where the residue of the coating layer adhered to the bare fiber, but it is possible to easily remove the residue with a cleaning cloth or the like. "C" indicates a case where the residue of the coating layer adheres to the bare fiber and may damage the bare fiber in a case of attempting to remove it.

As shown in Table 2, the ease of removal of the coating layer is "A" when the pulling force is less than 1.0 N/mm, the ease of removal of the coating layer is "B" when the pulling force is 1.0 N/mm or more and 1.1 N/mm or less, the ease of removal of the coating layer is "C" when the pulling force is 1.2 N/mm or more.

TABLE 2

| Pulling force [N/mm] (Ease of removal of coating layer) | | Moisture content W of humidity controlled gas ($g/m^3$) | | | | | | | |
|---|---|---|---|---|---|---|---|---|---|
| | | 2 | 3 | 4 | 5 | 10 | 15 | 20 | 22 |
| Humidification time T (sec) | 0.05 | 1.5 (C) | 1.3 (C) | 1.2 (C) | 1.2 (C) | 1.0 (B) | 0.9 (A) | 0.5 (A) | 0.3 (A) |
| | 0.1 | 1.4 (C) | 1.2 (C) | 1.1 (B) | 0.9 (A) | 0.7 (A) | 0.6 (A) | 0.3 (A) | 0.3 (A) |
| | 0.2 | 1.3 (C) | 1.2 (C) | 1.0 (B) | 0.5 (A) | 0.5 (A) | 0.5 (A) | 0.3 (A) | 0.3 (A) |
| | 0.3 | 1.2 (C) | 1.0 (B) | 0.8 (A) | 0.5 (A) | 0.4 (A) | 0.4 (A) | 0.3 (A) | 0.3 (A) |
| | 0.4 | 1.2 (C) | 1.0 (B) | 0.7 (A) | 0.4 (A) | 0.3 (A) | 0.3 (A) | 0.3 (A) | 0.3 (A) |

As shown in Table 2, in a case where the moisture content W was 15 $g/m^3$ or more, although the humidification time T was 0.05 to 0.4 seconds, the ease of removal of the coating layer was within an allowable range (A or B). On the other hand, in a case where the moisture content W was 5 $g/m^3$ or less, the ease of removal of the coating layer was poor (C), in a case where the humidification time is short. As described above, it was confirmed that, in a case where the humidification is insufficient, the coating layer adheres excessively to the bare fiber B and it is difficult to remove the coating layer.

When Tables 1 and 2 are compared to each other, the conditions under which the coating layer is not peeled off and the ease of removal of the coating layer is A or B are expressed by Mathematical Expressions (3) to (5).

$$3 \leq W \leq 5 \text{ and } 0.3 \leq T \leq 0.4 \quad (3)$$

$$4 \leq W \leq 15 \text{ and } 0.1 \leq T \leq 0.3 \quad (4)$$

$$10 \leq W \leq 15 \text{ and } 0.05 \leq T \leq 0.3 \quad (5)$$

By setting the moisture content W ($g/m^3$) of the humidity controlled gas and the humidification time T (sec) so as to satisfy any of Mathematical Expressions (3) to (5), it is possible to provide an optical fiber capable of preventing the peeling of the coating layer in the manufacturing process and removing the coating layer during fusion splicing work, and the like.

In addition, when Tables 1 and 2 are compared to each other, the conditions under which the coating layer is not peeled off and the ease of removal of the coating layer is A are expressed by Mathematical Expressions (6) and (7).

$$5 \leq W \leq 15 \text{ and } 0.1 \leq T \leq 0.3 \quad (6)$$

$$4 \leq W \leq 5 \text{ and } 0.3 \leq T \leq 0.4 \quad (7)$$

By setting the moisture content W ($g/m^3$) of the humidity controlled gas and the humidification time T (sec) so as to satisfy Mathematical Expressions (6) and (7), it is possible to provide an optical fiber capable of preventing the peeling of the coating layer in the manufacturing process and more easily removing the coating layer during fusion splicing work, and the like.

Furthermore, by exposing the bare fiber to the humidity controlled gas such that the pulling force that the bare fiber is pulled from the coating layer is 1.1 N/mm or less, it is possible to provide an optical fiber capable of preventing the peeling of the coating layer in the manufacturing process and more easily removing the coating layer during fusion splicing work, and the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

1 . . . Building
3 . . . Cooling device
10A to 10C . . . Manufacturing apparatus
B . . . Bare fiber
F . . . Optical fiber

What is claimed is:

1. A method for manufacturing an optical fiber, the method comprising:

exposing a bare fiber having a temperature of 500° C. to 1,500° C. to a gas in which a moisture content is controlled to 2 to 20 g/m³, wherein the bare fiber is formed of glass;

applying an uncured resin to an outer periphery of the bare fiber; and curing the resin to form a coating layer, wherein any one of Expression (3), (4), or (5) is satisfied:

$3 \leq W \leq 5$ and $0.3 \leq T \leq 0.4$      (3);

$4 \leq W \leq 15$ and $0.1 \leq T \leq 0.3$      (4);

$10 \leq W \leq 15$ and $0.05 \leq T \leq 0.3$      (5), where
W (g/m³) is the moisture content of the gas, and
T (sec) is a time for exposing the bare fiber to the gas.

2. The method for manufacturing an optical fiber according to claim 1, wherein the bare fiber is cooled by a cooling device after the bare fiber is exposed to the gas.

3. The method for manufacturing an optical fiber according to claim 1, wherein
the gas includes helium, and
the bare fiber is exposed to the gas in a cooling device for cooling the bare fiber.

4. The method for manufacturing an optical fiber according to claim 1, wherein the bare fiber is exposed to the gas such that a pulling force of the bare fiber pulled from the coating layer is 1.1 N/mm or less.

5. A method for manufacturing an optical fiber, the method comprising:

exposing a bare fiber having a temperature of 500° C. to 1,500° C. to a gas in which a moisture content is controlled to 2 to 20 g/m³, wherein the bare fiber is formed of glass;

applying an uncured resin to an outer periphery of the bare fiber; and curing the resin to form a coating layer, wherein Expression (6) or (7) is satisfied:

$10 \leq W \leq 15$ and $0.1 \leq T \leq 0.3$      (6);

$4 \leq W \leq 5$ and $0.3 \leq T \leq 0.4$      (7), where
W (g/m³) is the moisture content of the gas, and
T (sec) is a time for exposing the bare fiber to the gas.

6. The method for manufacturing an optical fiber according to claim 5, wherein the bare fiber is cooled by a cooling device after the bare fiber is exposed to the gas.

7. The method for manufacturing an optical fiber according to claim 5, wherein
the gas includes helium, and
the bare fiber is exposed to the gas in a cooling device for cooling the bare fiber.

8. The method for manufacturing an optical fiber according to claim 5, wherein the bare fiber is exposed to the gas such that a pulling force of the bare fiber pulled from the coating layer is 1.1 N/mm or less.

* * * * *